United States Patent [19]
Babaev et al.

[11] Patent Number: 5,478,391
[45] Date of Patent: Dec. 26, 1995

[54] CEMENTITIOUS MATERIALS AND METHOD OF MAKING THE SAME

[75] Inventors: Shahviran T. Babaev, Moscow; Nikolay F. Bashlykov, Himky; Sergey A. Zubehin, Podolsk; Valery N. Serduk; Roman L. Serykh, both of Moscow; Vicheslav R. Falikman, Dolgoprudniy; Boris E. Yudovetch; Vladimir P. Trambovetsky, both of Moscow, all of Russian Federation; Jaime Moreno, Chicago, Ill.; Claudio A. Eberhardt, Villa Olimpica, Mexico; Alfonso Cadaval, Madrid, Spain

[73] Assignee: Cement Technology Corporation, Chicago, Ill.

[21] Appl. No.: 38,149

[22] Filed: Mar. 26, 1993

[51] Int. Cl.$^6$ .................................... C04B 24/16
[52] U.S. Cl. .................. 106/725; 106/697; 106/708; 106/727; 106/739; 106/757; 106/790; 106/808; 106/809; 106/816; 106/817; 106/823; 524/650
[58] Field of Search ................... 106/725, 727, 106/724, 738, 739, 757, 789, 817, 819, 823, 697, 816, 708, 790, 808, 809; 524/2, 5, 650

[56] References Cited

U.S. PATENT DOCUMENTS

| | | | |
|---|---|---|---|
| 3,689,294 | 9/1972 | Brunauer | 106/725 |
| 3,960,582 | 6/1976 | Ball et al. | 106/725 |
| 4,019,918 | 4/1977 | Wills, Jr. | 106/725 |
| 4,032,353 | 6/1977 | Ball et al. | 106/725 |
| 4,069,063 | 1/1978 | Ball | 106/725 |
| 4,306,912 | 12/1981 | Forss | 106/725 |
| 4,405,372 | 9/1983 | Serafin et al. | 106/727 |
| 4,424,074 | 1/1984 | Villa et al. | 106/823 |
| 4,441,929 | 4/1984 | Marcellis et al. | 106/823 |
| 4,460,720 | 7/1984 | Gaidis et al. | 524/5 |
| 4,906,298 | 3/1990 | Natsuume et al. | 106/727 |
| 5,076,851 | 12/1991 | Skouara et al. | 106/727 |
| 5,125,976 | 6/1992 | Skovara et al. | 106/725 |

OTHER PUBLICATIONS

Ramachandran, "Concrete Admixtures Handbook", Noyes Publications, N.J. 1984, p. 581.

*Primary Examiner*—Mark L. Bell
*Assistant Examiner*—Michael Marcheschi
*Attorney, Agent, or Firm*—Palmatier & Zummer

[57] ABSTRACT

The cementitious material comprises an initial mixture of portland cement clinker and a modifier ranging in weight from approximately 0.5% to 5%, preferably 1%, of the weight of the clinker. The modifier is selected from a group comprising (a) a melamine formaldehyde-sodium bisulfite copolymer, and (b) sodium naphthalene sulfonate. The portland cement clinker and the modifier are intimately mixed and caused to react together in a solid state reaction by energetically grinding them together in a highly energetic ball-and-tube grinding mill to a high degree of fineness of at least approximately 5000 Blaine. Modified cementitious materials are produced by providing an additional constituent in the initial mixture comprising a hard, dense, substantially inert mineral material ranging up to 70% of the mixture by weight. The percentages of the portland cement clinker and the modifier are correspondingly reduced. The modified initial mixture is ground as before. The cementitious materials are substituted for traditional portland cement in making concrete having increased strength, density, durability and impermeability, while having decreased water demand, porosity and capillarity. The mineral material is selected from a group comprising sand, comminuted stone, comminuted scrap material from glass making, comminuted waste material from ore enrichment plants, comminuted volcanic material, comminuted slag, fly ash, comminuted pumice, and comminuted perlites.

29 Claims, No Drawings

CEMENTITIOUS MATERIALS AND METHOD OF MAKING THE SAME

FIELD OF THE INVENTION

This invention relates to improved cementitious materials adapted to be substituted for conventional portland cement for making concrete and all other products in which portland cement is used. The cementitious material of the present invention will produce concrete having greatly increased strength, density, hardness and impermeability. The invention also relates to methods of making the improved cementitious materials.

BACKGROUND OF THE INVENTION

Conventional portland cement is widely used in making concrete for structural uses and for producing pavements such as road surfaces, sidewalks and the like. Portland cement is generally in the form of a finely divided gray powder which is made by grinding portland cement clinker to a high degree of fineness. Portland cement clinker is generally made by intensely heating a mixture of pulverized limestone and certain types of pulverized clay until incipient fusion of the pulverized mixture occurs, whereupon the resulting product is cooled to form the portland cement clinker. A special rotary furnace is generally used to heat the mixture.

Concrete is generally made by producing a mixture of portland cement, sand, gravel or other aggregate, and water. In the hardening of concrete, the water reacts and combines with the portland cement. Any excess water evaporates.

Concrete sets or solidifies in a matter of hours, but the full ultimate strength of the concrete develops slowly over a longer period, such as 28 days, for example. Special grades of portland cement are available to produce high early strength in the concrete. Such special grades of portland cement are generally ground to an especially high degree of fineness.

OBJECTS OF THE INVENTION

A general object of the present invention is to provide new and improved cementitious materials adapted to be substituted for conventional portland cement to produce concrete having substantially improved strength, density and hardness.

A further object of the invention is to provide new and improved cementitious materials having decreased water demand and improved dispersity, workability and plasticity, when compared with conventional portland cement.

Another object of the present invention is to provide new and improved cementitious materials for producing concrete having high and enhanced matrix density, impermeability and durability, when compared with concrete made with conventional portland cement.

A further object is to provide new and improved cementitious materials for producing concrete having high early strength and greatly increased ultimate structural strength, compared with concrete made with conventional portland cement.

Another object of the present invention is to provide improved methods of making the improved cementitious materials.

SUMMARY OF THE INVENTION

To achieve these and other objects, the present invention provides an improved cementitious material, comprising an initial mixture of portland cement clinker, and an effective modifying amount of a modifier, preferably ranging in weight from approximately 0.5% to approximately 5% of the weight of the portland cement clinker, the portland cement clinker and the modifier being intimately mixed and caused to react together in a solid state reaction by energetically grinding them together to a high degree of fineness, preferably at least approximately 5000 Blaine, the modifier being selected from a group comprising (a) a melamine formaldehyde-sodium bisulfite copolymer, and (b) sodium naphthalene sulfonate.

The preferred proportion of the modifier is approximately 1% by weight of the portland cement clinker.

The cementitious materials defined thus far in this Summary of the Invention are adapted to be used in producing concrete having extremely high structural strength, density, hardness and impermeability. For applications in which such extremely high strength is not required, the initial mixture may comprise portland cement clinker, the modifier, and an additional constituent comprising a hard, dense, substantially inert mineral material. As before, the portland cement clinker, the modifier and the additional constituent are energetically ground together to a high degree of fineness, preferably approximately 5000 Blaine or more.

The additional constituent, comprising a hard, dense, substantially inert mineral material, may be selected from a group comprising (a) sand, (b) comminuted stone, (c) comminuted scrap material from glass making, (d) comminuted waste material from ore enrichment plants, (e) comminuted volcanic material, (f) comminuted slag, (g) fly ash, (h) comminuted pumice, and (i) comminuted perlites.

The proportion of the portland cement clinker in the initial mixture may range from approximately 99% to approximately 30% by weight, while the proportion of the additional constituent ranges from approximately 1% to approximately 70% by weight.

The present invention provides an improved method of making an improved cementitious material, such method comprising the steps of mixing a modifier with portland cement clinker in a highly energetic grinding mill to produce an initial mixture, the weight of the modifier comprising an effective modifying amount, preferably ranging from approximately 0.5% to 5% of the weight of the portland cement clinker, the modifier being selected from a group comprising (a) a melamine formaldehyde-sodium bisulfite copolymer, and (b) a naphthalene modifier comprising sodium naphthalene sulfonate, and then comminuting the initial mixture while also causing a solid state reaction to occur between the portland cement and the modifier by energetically grinding the initial mixture in the grinding mill to a high degree of fineness, preferably at least approximately 5000 Blaine.

The initial mixing step may include adding an additional constituent comprising a hard, dense, substantially inert mineral material, the initial mixture and the additional constituent being energetically ground together in the grinding mill to a high degree of fineness of at least approximately 5000 Blaine.

The hard, dense, substantially inert mineral material may be selected from a group comprising (a) sand, (b) comminuted stone, (c) comminuted scrap material from glass making, (d) comminuted waste material from ore enrichment plants, (e) comminuted volcanic material, (f) comminuted slag, (g) fly ash, (h) comminuted pumice, and (i)

comminuted perlites.

The proportion of the portland cement clinker in the initial mixture may range from approximately 99% to approximately 30% by weight, while the proportion of the additional constituent ranges from approximately 1% to approximately 70% by weight.

The grinding mill is highly energetic and is preferably of the ball-and-tube type.

DETAILED DESCRIPTION OF ILLUSTRATIVE EMBODIMENTS

In accordance with the present invention, an initial mixture is produced, comprising a major proportion of conventional portland cement clinker and a minor but effective proportion of a modifier, intended to increase the bonding efficiency of the ultimate cementitious material, while also reducing the water demand of the material. The initial mixture is preferably prepared or placed in a highly energetic mechanical grinding mill, preferably of the ball-and-tube type, and also preferably having batchers for receiving and weighing the constituents which are then dumped into the mill. The mill is employed to grind the portland cement clinker and the modifier together with a high degree of energy, so that they become intimately mixed and also are caused to react together in a solid state reaction, while being ground to an extremely high degree of fineness of at least approximately 5000 Blaine. Those skilled in the art will understand that the unit known as Blaine is a measure of the ratio between the total surface area in square centimeters and the total mass in grams of any powdered or finely divided material. When a solid material or a mixture of solid materials is ground to a high degree of fineness, the total surface area of the solid material is increased while the total volume of the solid material remains substantially unchanged. The mill is preferably provided with a separator for separating and removing the finely divided cementitious material from the mill, when the material has been ground to the desired degree of fineness.

As previously described herein, the portland cement clinker may be of any known or suitable type, produced by any known or suitable method. The modifier is employed in an effective modifying amount. Preferably, the weight of the modifier ranges from approximately 0.5% to approximately 5% of the weight of the portland cement clinker. As a preferred example, the weight of the modifier comprises approximately 1% of the weight of the portland cement clinker.

The modifier is selected from a group comprising (a) a melamine formaldehyde-sodium bisulfite copolymer, and (b) a naphthalene modifier comprising sodium naphthalene sulfonate. The copolymer, constituting the first member of the group and designated (a) above may have a molecular weight ranging from approximately 5000 to approximately 20,000.

The modifiers identified as (a) and (b) above are sometimes referred to as the melamine based modifier and the naphthalene based modifier, respectively.

As previously indicated, the cementitious material is completed by operating the grinding mill with a high degree of energy so as to grind or comminute the portland cement clinker and the modifier together very energetically, to an extremely high degree of fineness, preferably at least approximately 5000 Blaine. The energetic grinding causes a solid state reaction between the constituents so that molecular binding is believed to occur therebetween.

The cementitious material as described thus far has a 100% concentration and comprises the finely divided portland cement bonded with the modifier. The cementitious material may be used instead of ordinary portland cement to make concrete having greatly increased structural strength, durability and density, while having a greatly reduced water demand and extremely low porosity and permeability by water. The concrete is made by mixing the cementitious material with sand or some other relatively fine aggregate, gravel or some other relatively coarse aggregate, and the smallest possible amount of water to produce wet concrete which is workable and moldable. The modifier enhances the workability of the wet concrete mixture.

The following examples will illustrate the characteristics of concrete made with the 100% concentration cementitious materials.

EXAMPLE 1

A cementitious material or binder is made by using an initial mixture comprising a suitable batch of portland cement clinker and 1% by weight of a modifier comprising a melamine formaldehyde-sodium bisulfite copolymer. The initial mixture is energetically ground in a ball-and-tube grinding mill to an extremely high degree of fineness of at least approximately 5000 Blaine, whereby a solid state reaction is caused between the constituents. The 100% cementitious binder material is used to produce concrete which develops a strength of over 14,000 psi (100 Mpa) after curing for 28 days without heat treatment. The concrete is mixed, transported, placed and compacted in the same manner as traditional concrete. The new concrete reaches a compressive strength of 4,000 psi (28 Mpa) after hardening for 12–16 hours in natural conditions at an ambient temperature of 20° C. (68° F.).

EXAMPLE 2

A cementitious material or binder is made using an initial mixture comprising a suitable batch of portland cement clinker and 1% by weight of a naphthalene modifier comprising sodium naphthalene sulfonate. The initial mixture is energetically ground in a ball-and-tube type grinding mill to an extremely high degree of fineness of at least approximately 5000 Blaine, whereby a solid state reaction is caused to occur between the portland cement and the other constituents. The resulting 100% concentration cementitious material or binder is used to produce concrete which develops a strength of over 14,000 psi (100 Mpa) after curing for 28 days without heat treatment. The concrete is mixed, transported, placed and compacted in the same manner as traditional concrete. The new concrete reaches a compressive strength of 4,000 psi (28 Mpa) after hardening for 12–16 hours in natural conditions at an ambient temperature of 20° C. (68° F.).

In both examples, the concrete is extremely strong, durable and dense and has extremely low porosity and very small permeability by water. The concrete is greatly superior to concrete made with the use of ordinary portland cement.

In both examples any known or suitable retarding additives may be included in the initial mixture to retard the setting of the wet concrete mixture.

Many concrete applications do not require concrete having the extremely high structural strength which is achieved by using the 100% concentration cementitious materials in making the concrete. For producing cementitious materials for less demanding applications, an additional constituent may be advantageously employed in the initial mixture containing the portland cement clinker and the modifier. The additional constituent comprises a hard, dense, substantially inert mineral material. When the additional constituent is used in the initial mixture, the amounts of the portland cement clinker and the modifier in the initial mixture may be proportionately reduced. When the additional constituent is used in the initial mixture, the proportion of the portland cement clinker ranges from approximately 99% to approximately 30% by weight, while the proportion of the additional constituent ranges from approximately 1% to approximately 70% by weight. As previously indicated, the weight of the modifier in the initial mixture is an effective modifying amount, preferably ranging from approximately 0.5% to approximately 5% of the weight of the portland cement clinker.

The additional constituent, comprising hard, dense, substantially inert mineral material, is preferably selected from a group comprising (a) sand, which may be feldspar sand or quartz sand (irrespective of the gradation factor), or quartz aggregate screenings; (b) comminuted stone, which may be wastes of stone crushing factories or of stone polishing, or crushed effusive rock; (c) comminuted scrap material from glass making; (d) comminuted waste material from ore enrichment plants; (e) comminuted volcanic material, such as volcanic ash, including hydraulically inactive types, volcanic tuffs and volcanic trasses; (f) comminuted slag, including granulated blast-furnace slags, other fuel slags, and ash-slag wastes; (g) fly ash; (h) comminuted pumice; and (i) comminuted perlites such as non-expanded perlites.

The incorporation of the modifier in the cementitious materials of the present invention has the important and highly advantageous result of producing cementitious binders having low water demand. A cementitious paste is produced by mixing water with the cementitious materials of the present invention. As a result of the incorporation of the modifier, a cementitious paste of normal consistency requires 35% to 45% less water than in the case of traditional varieties of portland cement. Thus, the incorporation of the modifier improves the plasticity and the workability of the cementitious paste. This property of low water demand varies to some extent according to the mineral composition of the portland cement clinker, the nature of the inert mineral additive, if used, and the selection and formulation of the modifier.

The dry cementitious materials of the present invention have the advantage of greatly enhanced storage life. The reactivity of the cementitious materials does not decrease appreciably for up to 6 months when stored outdoors. In contrast, the reactivity of traditional portland cement drops or decreases approximately 7–10% for every 30 days of outdoor storage. The greatly increased storage life of the cementitious materials of the present invention is believed to be due to the protective action of the modifier which has been reactively combined with the portland cement contained in the cementitious mixtures.

When any cementitious material of the present invention is used in making concrete, the low water demand of the cementitious material reduces the amount of water which needs to be added to the concrete mixture to produce a mixture which is sufficiently plastic and workable to be pourable and moldable. After hardening and curing, the concrete is characterized by greatly enhanced durability. Thus, the concrete is highly resistant to chemical agents in the environment, such as sulfate solutions. Moreover, the concrete has a high degree of impermeability to water, so that the concrete is highly resistant to alternate wetting and drying and to frost action.

The durability of the hardened cementitious paste of the present invention is due not only to the low water content thereof, but also to the action of the modifier in chemically protecting the hardened hydration products in the hardened cementitious paste.

The durability of the concretes manufactured with the cementitious materials of the present invention is due to several factors. The high dispersion and hydration activity of the cementitious binder reduce the level of defects in the hardened cementitious paste and in the interface between the aggregate and the hardened paste. The low water demand of the cementitious binder minimizes the porosity and the capillarity of the hardened paste. Conventional concrete made with ordinary portland cement has large pores and capillary openings which act as stress concentrators and cause reduction of the durability of the concrete. In concretes made with the cementitious materials of the present invention, the reduction of porosity and capillarity greatly increases the durability of the concrete.

As to setting time, the cementitious materials of the present invention produce results which are substantially the same as for ordinary portland cements. Thus, the setting of the concrete starts after 45 minutes at the earliest and ends no later than 6 hours after the concrete is mixed and poured. The setting characteristics are controllable and can be adjusted over a broad range at the request of the customer.

Shrinkage and creep deformations of concretes made with the cementitious materials of the present invention are lower by approximately 15% and 20%, respectively, than the shrinkage and creep deformations experienced with traditional concretes. The improved shrinkage and creep characteristics are due mainly to the low water demand of the cementitious materials of the present invention. The reduction in shrinkage and creep is particularly advantageous for prestressed reinforced concrete structures.

The following examples will illustrate the characteristics of concretes made with cementitious materials of the present invention, containing the additional constituent comprising a hard, dense, substantially inert mineral material of the composition disclosed previously herein. For brevity, such additional constituent will be referred to as an inert mineral material.

EXAMPLE 3

A cementitious material or binder is made by using an initial mixture comprising approximately 50% by weight of portland cement clinker, a modifier as previously described herein having a weight which is approximately 1% of the weight of the portland cement clinker, and an inert mineral material having a weight which is substantially the same as the weight of the portland cement clinker. Either the melamine based modifier or the naphthalene based modifier may be employed in the initial mixture, which is prepared in or dumped into a powerful or highly energetic grinding mill, whereby the initial mixture is energetically ground to an extremely high degree of fineness of at least approximately 5000 Blaine. The energetic grinding causes a solid state reaction between the portland cement and the modifier. The resulting cementitious material, which may be referred to as a 50% concentration cementitious material or binder, is used in the conventional manner to produce concrete. After hardening and curing for 28 days, the concrete reaches a strength of over 5000 psi (35 Mpa). Such concrete is entirely suitable for the production of reinforced concrete structures. Thus, the 50% concentration cementitious mixture of the present invention may be employed very advantageously as a substitute for high-strength conventional portland cement in the production of such reinforced concrete structures and the like.

EXAMPLE 4

A cementitious material or binder is made by preparing an initial mixture comprising approximately 40% by weight of portland cement clinker, a modifier as previously described herein having a weight which is approximately 1% of the weight of the portland cement clinker, and an inert mineral material, of the character previously disclosed herein, having a weight which is approximately 60% of the weight of the initial mixture. Either the melamine based modifier or the naphthalene based modifier may be employed in the initial mixture, which is prepared in or dumped into a highly energetic grinding mill, whereby the initial mixture is ground to an extremely high degree of fineness of at least approximately 5000 Blaine, whereby a solid state reaction is caused between the portland cement and the modifier. The resulting cementitious material, which may be referred to as a 40% concentration cementitious material or binder, is used in the conventional manner to produce concrete. After hardening and curing for 28 days, the concrete reaches a strength of over 4000 psi (28 Mpa). Such concrete is suitable for the production of many types of concrete slabs and other similar structures.

EXAMPLE 5

A cementitious material or binder is made by preparing an initial mixture comprising approximately 30% by weight of portland cement clinker, a modifier as previously described herein having a weight which is approximately 1% of the weight of the portland cement clinker, and an inert mineral material, of the character disclosed herein, having a weight which is approximately 70% of the total weight of the initial mixture. Either the melamine based modifier or the naphthalene based modifier may be employed in the initial mixture, which is prepared in or dumped into a highly energetic grinding mill, whereby the initial mixture is ground to an extremely high degree of fineness of at least approximately 5000 Blaine. A solid state reaction is caused between the portland cement and the modifier. The resulting cementitious material, which may be referred to as a 30% concentration cementitious material or binder, is used in the conventional manner to produce concrete. After hardening and curing for 28 days, the concrete reaches a strength of somewhat less than 4000 psi (28 Mpa), but the concrete is still useful in the production of concrete slabs and other similar structures as to which great strength is not needed.

The present invention is useful for the production of many special purpose cements, including high-strength, sulfate-resistant cements; grouting cements; road-building cements; low-heat cements; expansive cements; low-shrinkage cements, and decorative cements, for example.

In all of the methods and examples of the present invention as described herein, the initial mixture containing the portland cement clinker and the modifier must be ground together in a sufficiently energetic manner to cause a solid state reaction to occur between the portland cement and the modifier. If the energy of the grinding operation is not sufficiently energetic, the resulting cementitious material will not be capable of producing concrete having the greatly improved characteristics of greatly increased structural strength, durability and density and greatly reduced water demand, porosity and capillarity, as well as the other advantages of the present invention as described herein. If the grinding is not sufficiently energetic, the resulting cementitious material will behave approximately the same as if the constituents had simply been mixed together.

The production of portland cement clinker ordinarily involves the combustion of fuel and the generation of waste products which can cause air pollution and thus must be dealt with. The present invention has the important advantage of reducing the amount of portland cement clinker which is needed in the cementitious materials of the present invention. Thus, the present invention has the important advantages of reducing energy consumption and reducing the production of potential pollution products. Because of these attractive advantages, the present invention is an extremely significant advance in the technology relating to the production and use of highly efficient cementitious materials.

Various other modifications, alternative constructions and equivalents may be employed without departing from the true spirit and scope of the present invention as disclosed herein and as defined in the following claims.

We claim:

1. An improved cementitious material, comprising a chemically bonded solid state reaction product comprising an initial mixture of portland cement clinker, and an effective amount of a strengthening and plasticizing modifier, said mixture of said portland cement clinker and said modifier being intimately mixed and caused to react together chemically in a solid state reaction by grinding them together in a highly energetic grinding mill to a high degree of fineness of at least approximately 5000 Blaine to produce molecular bonding between the ground portland cement clinker and modifier, said modifier being selected from a group consisting of
  (a) a melamine formaldehyde-sodium bisulfite copolymer, and
  (b) sodium naphthalene sulfonate.

2. A cementitious material according to claim 1, in which said modifier ranges in weight from approximately 0.5% to approximately 5% of the weight of the portland cement clinker.

3. A cementitious material according to claim 1, in which the weight of the modifier comprises approximately 1% of the weight of the portland cement clinker.

4. An improved cementitious material, comprising a chemically bonded solid state reaction product comprising an initial mixture of portland cement clinker, and a strengthening and plasticizing modifier ranging in weight from approximately 0.5% to approximately 5% of the weight of the portland cement clinker, said portland cement clinker and said modifier being intimately mixed and caused to react together chemically in a solid state reaction by grinding them together in a highly energetic grinding mill to a high degree of fineness of at least approximately 5000 Blaine to produce molecular bonding between the ground portland cement clinker and modifier, said modifier comprising a melamine formaldehyde-sodium bisulfite copolymer.

5. A cementitious material according to claim 4, in which the weight of the modifier comprises approximately 1% of the weight of the portland cement clinker.

6. An improved cementitious material, comprising a chemically bonded solid state reaction product comprising an initial mixture of portland cement clinker, and an effective amount of a strengthening and plasticizing modifier, said portland cement clinker and said modifier being intimately mixed and caused to react together chemically in a solid state reaction by grinding them together in a highly energetic grinding mill to a high degree of fineness of at least approximately 5000 Blaine to produce molecular bonding between the ground portland cement clinker and modifier, said modifier comprising sodium naphthalene sulfonate.

7. A cementitious material according to claim 6, in which the weight of the modifier comprises approximately 0.5% to approximately 5% of the weight of the portland cement clinker.

8. A process of making an improved cementitious material, said process comprising the steps of mixing an effective amount of a strengthening and plasticizing modifier and portland cement clinker in a highly energetic grinding mill to produce an initial mixture, said modifier being selected from a group consisting of
(a) a melamine formaldehyde-sodium bisulfite copolymer, and
(b) a naphthalene modifier consisting
essentially of sodium naphthalene sulfonate, and then comminuting the initial mixture and causing a solid state chemical bonding reaction to occur between the portland cement clinker and the modifier by grinding the initial mixture in the grinding mill to a high degree of fineness of at least approximately 5000 Blaine to produce molecular bonding between the ground portland cement clinker and modifier.

9. A process according to claim 8, in which the weight of said modifier ranges from approximately 0.5% to approximately 5% of the weight of the portland cement clinker.

10. A process according to claim 8, in which the highly energetic grinding mill is a ball-and-tube grinding mill.

11. A cementitious material according to claim 4, in which said melamine formaldehyde-sodium bisulfite copolymer has a molecular weight ranging from approximately 5000 to approximately 20,000.

12. Am improved cementitious material, comprising a molecularly bonded solid state reaction product of co-ground-together portland cement clinker and an effective strengthening and plasticizing amount of a modifier selected from a group consisting of
(a) a melamine formaldehyde-sodium bisulfite copolymer, and
(b) sodium naphthalene sulfonate, co-ground together to a fineness of at least approximately 5000 Blaine.

13. A cementitious material according to claim 12, in which said modifier ranges in weight from approximately 0.5% to approximately 5% of the weight of the portland cement clinker.

14. A cementitious material according to claim 12, in which the weight of the modifier comprises approximately 1% of the weight of the portland cement clinker.

15. A cementitious material according to claim 12, in which said modifier consists essentially of a melamine formaldehyde-sodium bisulfite copolymer.

16. A cementitious material according to claim 12, in which said modifier consists essentially of sodium naphthalene sulfonate.

17. A cementitious material according to claim 12, comprising an additional co-ground constituent consisting essentially of a hard, dense, inert mineral material co-ground to a fineness of at least approximately 5000 Blaine.

18. A cementitious material according to claim 17, in which the proportion of the portland cement clinker ranges from approximately 99% to approximately 30% by weight, while the proportion of the inert mineral material ranges from approximately 1% to approximately 70% by weight.

19. A cementitious material according to claim 17, in which said hard, dense, inert mineral material is selected from a group consisting of
(a) sand,
(b) comminuted stone,
(c) comminuted scrap material from glass making,
(d) comminuted waste material from ore enrichment plants,
(e) comminuted volcanic material,
(f) comminuted slag,
(g) fly ash,
(h) comminuted pumice, and
(i) comminuted perlites.

20. A cementitious material according to claim 1, in which the initial mixture further comprises a hard, dense, inert mineral material selected from a group consisting of
(a) sand,
(b) comminuted stone,
(c) comminuted scrap material from glass making,
(d) comminuted waste material from ore enrichment plants,
(e) comminuted volcanic material,
(f) comminuted slag,
(g) fly ash, and
(h) comminuted perlites, all of said mixture being ground together in a highly energetic grinding mill to a high degree of fineness of at least approximately 5000 Blaine.

21. A cementitious material according to claim 20, in which the proportion of the portland cement clinker ranges from approximately 99% to approximately 30% by weight, while the proportion of the inert mineral material ranges from approximately 1% to approximately 70% by weight.

22. A cementitious material according to claim 4, in which the initial mixture further comprises a hard, dense, inert mineral material selected from a group consisting of
(a) sand,
(b) comminuted stone,
(c) comminuted scrap material from glass making,
(d) comminuted waste material from ore enrichment plants,
(e) comminuted volcanic material,
(f) comminuted slag,
(g) fly ash, and
(h) comminuted perlites, all of the initial mixture being ground together in a highly energetic grinding mill to a high degree of fineness of at least approximately 5000 Blaine.

23. A cementitious material according to claim 22, in which the proportion of the portland cement clinker in the mixture ranges from approximately 99% to approximately 30% by weight, while the proportion of the inert mineral material ranges from approximately 1% to approximately 70% by weight.

24. A cementitious material according to claim 6, in which said initial mixture further comprises a hard, dense, inert mineral material selected from a group consisting of
 (a) sand,
 (b) comminuted stone,
 (c) comminuted scrap material from glass making,
 (d) comminuted waste material from ore enrichment plants,
 (e) comminuted volcanic material,
 (f) comminuted slag,
 (g) fly ash, and
 (h) comminuted perlites, all of the initial mixture being ground together in a highly energetic grinding mill to a high degree of fineness of at least approximately 5000 Blaine.

25. A cementitious material according to claim 24, in which the proportion of the portland cement clinker in the mixture ranges from approximately 99% to approximately 30% by weight, while the proportion of the hard, dense inert mineral material ranges from approximately 1% to approximately 70% by weight.

26. A process according to claim 9, in which the initial mixing step includes adding a hard, dense, inert mineral material selected from a group consisting of
 (a) sand,
 (b) comminuted stone,
 (c) comminuted scrap material from glass making,
 (d) comminuted waste material from ore enrichment plants,
 (e) comminuted volcanic material,
 (f) comminuted slag,
 (g) fly ash, and
 (h) comminuted perlites, all of the initial mixture being simultaneously comminuted and ground together in the highly energetic grinding mill to a high degree of fineness of at least approximately 5000 Blaine.

27. A process according to claim 26, in which the proportion of the portland cement clinker in the initial mixture ranges from approximately 99% to approximately 30% by weight, while the proportion of the inert mineral material ranges from approximately 1% to approximately 70% by weight.

28. A cementitious material according to claim 12, comprising an additional co-ground constituent consisting essentially of a hard, dense, inert mineral material co-ground to a fineness of at least approximately 5000 Blaine, said hard, dense, inert mineral material being selected from a group consisting of
 (a) sand,
 (b) comminuted stone,
 (c) comminuted scrap material from glass making,
 (d) comminuted waste material from ore enrichment plants,
 (e) comminuted volcanic material,
 (f) comminuted slag,
 (g) fly ash, and
 (h) comminuted perlites.

29. A cementitious material according to claim 28, in which the proportion of the portland cement clinker ranges from approximately 99% to approximately 30% by weight, while the proportion of the hard, dense, inert mineral material ranges from approximately 1% to approximately 70% by weight.

* * * * *